United States Patent [19]

Jensen et al.

[11] Patent Number: 5,293,597
[45] Date of Patent: Mar. 8, 1994

[54] CONCURRENT CONTEXT MEMORY MANAGEMENT UNIT

[75] Inventors: Craig W. Jensen, Aberdeen; Frederick R. Keller, Jackson, both of N.J.

[73] Assignee: AT&T Bell Laboratories, Murray Hill, N.J.

[21] Appl. No.: 737,961

[22] Filed: Jul. 30, 1991

Related U.S. Application Data

[63] Continuation of Ser. No. 529,765, May 25, 1990, abandoned, which is a continuation of Ser. No. 23,858, Mar. 9, 1987, abandoned.

[51] Int. Cl.$^5$ .................... G06F 12/10; G06F 12/14
[52] U.S. Cl. .................... 395/400; 395/425; 364/DIG. 1; 364/DIG. 2
[58] Field of Search .................... 395/400, 425

[56] References Cited

U.S. PATENT DOCUMENTS

| | | | |
|---|---|---|---|
| 4,163,280 | 7/1979 | Mori et al. | 364/200 |
| 4,228,496 | 10/1980 | Katzman et al. | 364/200 |
| 4,285,040 | 8/1981 | Carlson et al. | 364/200 |
| 4,365,295 | 12/1982 | Katzman et al. | 364/200 |
| 4,481,573 | 11/1984 | Fukunaga et al. | 364/200 |
| 4,519,032 | 5/1985 | Mendell | 364/200 |
| 4,525,778 | 6/1985 | Cane | 364/200 |
| 4,550,368 | 10/1985 | Bechtolsheim | 364/200 |
| 4,669,043 | 5/1987 | Kaplinsky | 364/200 |
| 4,737,909 | 4/1988 | Harada | 364/200 |
| 4,827,406 | 5/1989 | Bischoff | 364/200 |
| 4,831,581 | 5/1989 | Rubinfeld | 395/250 |
| 4,926,316 | 5/1990 | Baker et al. | 364/200 |
| 5,119,484 | 6/1992 | Fox | 395/375 |

OTHER PUBLICATIONS

Madnick, Stuart E. and Donovan, John J., *Operating Systems*, Copyright 1974, McGraw-Hill Book Co., pp. 105-198, 484, 485, 512-517, 522-529, 534-543, and 548-557.

Hayes, John P., *Computer Architecture and Organization*, Copyright 1978, McGraw-Hill Book Co., pp. 320-343 and 351-397.

Primary Examiner—Joseph L. Dixon
Assistant Examiner—Michael A. Whitfield
Attorney, Agent, or Firm—David R. Padnes

[57] ABSTRACT

A memory management arrangement facilitates interprocess data transfers by eliminating the need to construct temporary mapping tables when performing the data transfer operation. The arrangement includes the use of multiple and concurrent mapping tables in conjunction with the transmission of mapping table indentification bits with each data transfer operation.

8 Claims, 3 Drawing Sheets

CONCURRENT CONTEXT MMU

PRIOR ART HARDWARE CONFIGURATION

CONCURRENT CONTEXT MEMORY MANAGEMENT UNIT

This application is a continuation of application Ser. No. 529,765, filed on May 25, 1990, which is a continuation of Ser. No. 023,858, filed on Mar. 9, 1987 (both now abandoned).

BACKGROUND OF THE INVENTION

This invention relates to memory management units and, more particularly, to such units designed for the control of multiple, concurrently operating processes.

In computer usage, it is necessary to store data in memory and to retrieve that data as quickly as possible using as little central processing unit (CPU) time as possible. Thus, the CPU concerns itself only with gross instructions concerning the storage (or retrieval) of data and not with the actual physical location in memory where such data is to be stored.

For example, the CPU might issue an instruction to store a block of data from buffer A in memory at virtual address location LOC1. The CPU does not know where the data is stored physically but it does know that, if it desires to retrieve that same data, it can issue an instruction to retrieve data from virtual address LOC1, and the data will be available.

A memory management unit (MMU) is used to accomplish the task of controlling information flow in and out of a memory. The primary task of the MMU is to accept storage or retrieval assignments from the CPU and to translate the virtual address, as supplied from the CPU, into a physical location within the memory. Another important task of the MMU is to insure that the process which is calling for the writing or the retrieval of data has the proper permission to do so at the designated location in memory.

The MMU organizes the memory into variable length segments or into fixed length pages, or combinations of both, and establishes memory tables cross-referencing each virtual address to the associated actual physical address. These tables are called mapping tables and contain permission information as well as physical coordination information.

When the CPU is running a particular process, the MMU accesses only those tables associated with that process. The obvious reason for this is that each different process may issue an instruction to store a piece of data in the memory at virtual address LOC1. Thus, since data written into LOC1 for a first process is different from the data put into LOC1 for a second process, the MMU must store each of these data segments at different physical locations within the memory.

In the simplest form, the CPU sends to the MMU a virtual address together with a desired operation, i.e., read, write or execute instruction. The MMU, using the mapping table of the currently active CPU process, determines the physical location and cross checks the permissions.

Most MMUs maintain a memory cache of translation and permission tables directly in the MMU. If the information for a virtual address is in the cache, the MMU can perform its job without accessing the cross-reference table stored in main memory. If the information is not in the cache, the MMU must retrieve the proper table entry from main memory, check permissions and then send the physical address for the CPU's access to memory.

Since the MMU can only work with one process at a time, data transfers between two different processes require special work by the CPU. In order to transfer data between processes, the CPU must verify permissions and set up address tables so that the source and target data areas are both contained within one process. In addition, the process that is actually performing the transfer might be a third process. This requires a significant amount of work by the CPU thereby degrading system performance.

By way of example, assume that there are three processes A, B and C. Process A is a privileged process, and processes B and C are normal (unprivileged) processes. Processes B and C request that process A copy a block of data from process B LOC1 to process C LOC2 (LOC1 and LOC2 are virtual addresses; and LOC1 might be the same as LOC2, or different).

Process A must first verify that processes B and C have the proper permissions for the copy. To do this, process A must retrieve permission information for LOC1 of process B and then must verify that process B has read permission. This verification requires the transfer of mapping tables associated with process B. Process A must then retrieve permission information for each data storage block of LOC2 for process C and verify that each block has write permission. This requires a second transfer of mapping tables. If the permissions are correct, process A must then set up a scratch translation table area in the MMU pointing to the physical addresses involved in the copy. To do this, process A must cause the MMU to retrieve the translation information for LOC1 of process B and then set up its address tables so that its LOC2 points to the same physical addresses as process B's LOC1. Assume this to be physical address space PH000–PH100. Process A must then set up a translation table so that its LOC3 points to the same physical addresses as process C's LOC2. Assume this to be physical location PH200–PH300. Process A then copies the data from physical location PH000–PH100 (process B's LOC1) to physical location PH200–PH300 (process C's LOC2). This example has required the CPU to perform a significant amount of work, which, as discussed above, degrades system performance. The problem is significantly compounded when it is remembered that data transfer can span several memory sections and the translation tables need not be the same for all the data.

A compounding problem arises because the management of MMU's is part of any operating system and, thus, programs exist which rely upon the function already established. Thus, any attempt to change the MMU operation which results in necessary program changes, is difficult, at best, to achieve.

SUMMARY OF THE INVENTION

These and other problems have been solved by our system in which additional information is utilized by the MMU to establish the context of the transfer. Using this arrangement, three translation tables may reside in the MMU concurrently, each containing all of the contexts associated with the data blocks in question. Continuing with the example discussed above, process A would have a context of execute, and thus its translation table would be used only for execute access. Process B would have a context indentification of read, and thus its translation table would be used only for read access. Process C would carry the context designation of write, and thus its translation table would be used only for write access.

In our arrangement, there is no need to switch the MMU back and forth between process A, process B and process C since only the appropriate translation table will be used for each access.

The use of concurrent contexts is controlled by the process which provides the special context identification. Accordingly, if the context which identifies the concurrent context mode is not specified, the MMU will use the translation table of the currently running process (for all three operations-execute, read, and write) thereby allowing existing programs to run without difficulty.

BRIEF DESCRIPTION OF THE DRAWINGS

These and other objects and features, together with the operation and utilization of the present invention, will be more apparent from the illustrative embodiment shown in conjunction with the drawings in which.

DETAILED DESCRIPTION

Figure 1:
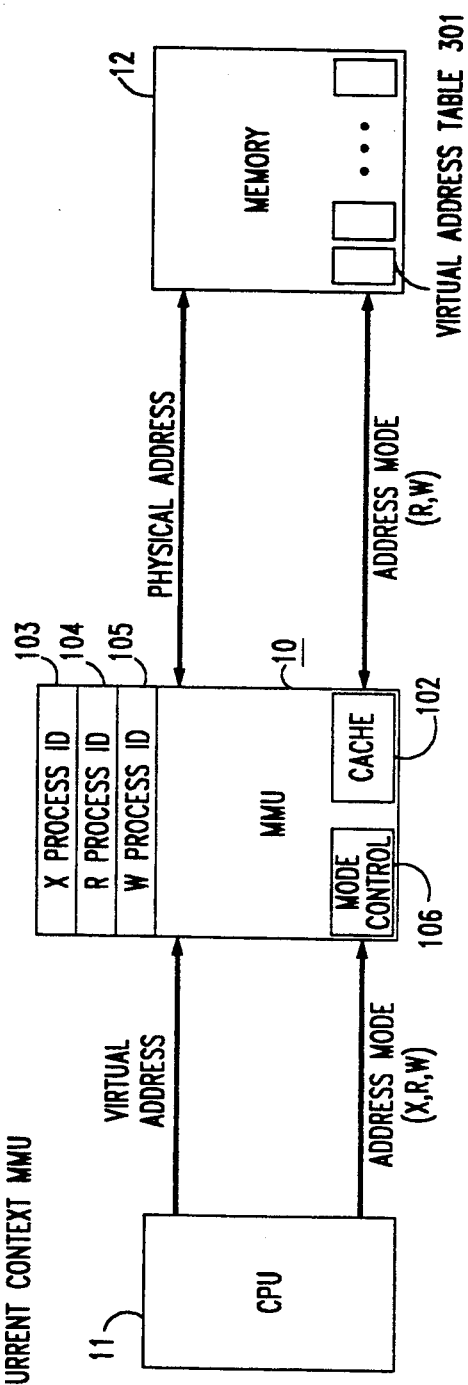
FIG. 1 shows the hardware configuration of the concurrent context MMU.
Figure 2:
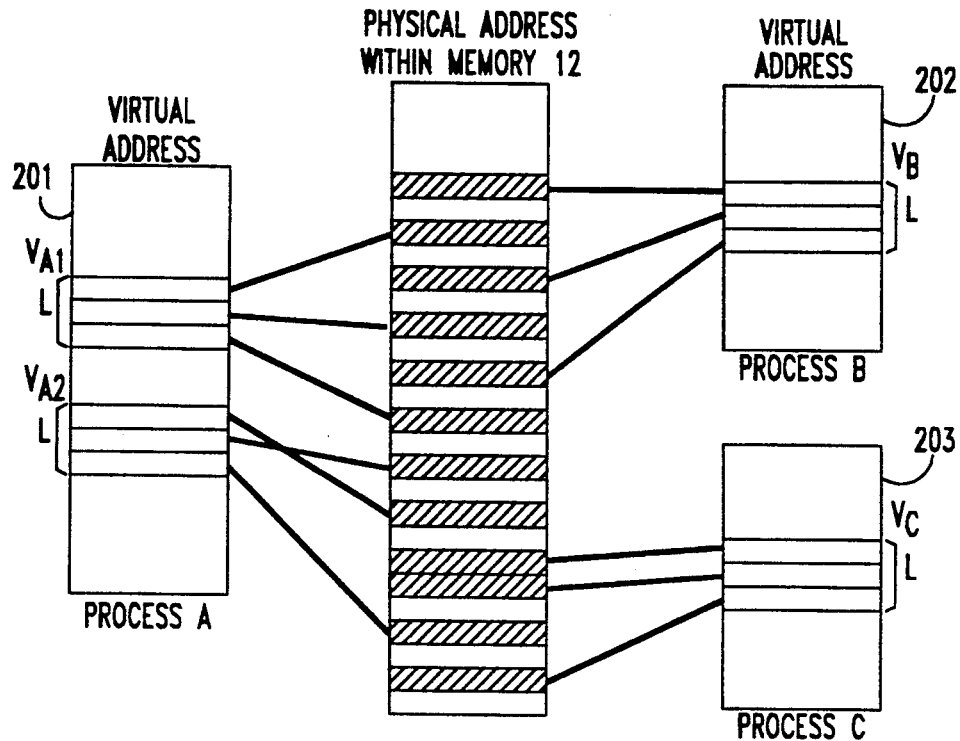
FIG. 2 shows an illustration of mapping between virtual and physical addresses.
Figure 3:
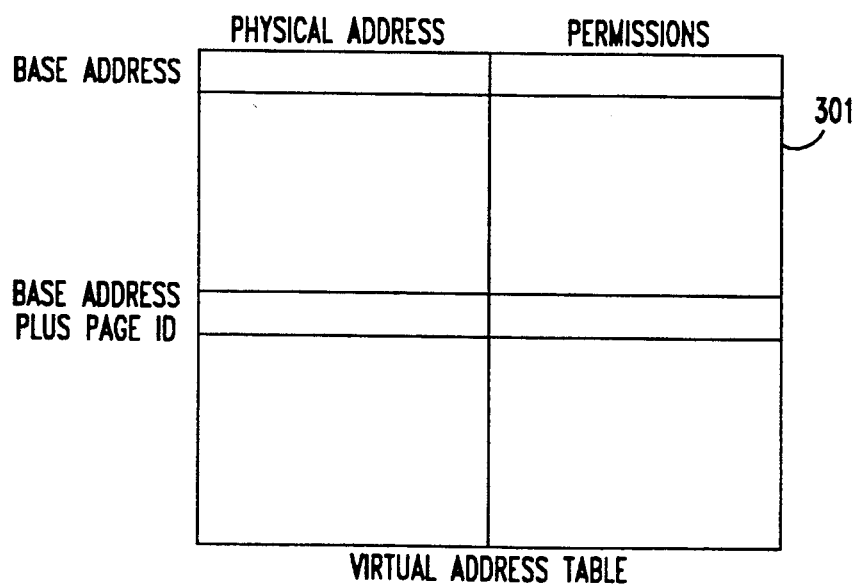
FIG. 3 shows mapping tables.

FIGS. 1-3 show one embodiment of our concurrent context MMU 10 with three processes, 201, 202 and 203. MMU 10 is shown with cache memory 102 and mode control 106, function and operation of which will be discussed hereinafter. MMU 10 operates in response to CPU 11 to store and retrieve information from memory 12, using virtual address tables 301.

Digressing momentarily, it should be noted that memory management arrangements are discussed in detail in the text *OPERATING SYSTEMS* by Madnick and Donovan, McGraw-Hill Book Company, published in 1974, which is hereby incorporated by reference herein.

REVIEW OF THE EXAMPLE

The following description continues the example discussed above, describes the current state-of-the-art solution, and describes the solution using our concurrent context MMU 10.

As shown in FIG. 2, there are three processes, 201, 202 and 203 (A, B and C). Process A is a privileged process, and processes B and C are normal (unprivileged) processes. Processes B and C request that process A copy a block of data from process B (L bytes of data starting at virtual address VB) to process C (starting at address VC). FIG. 2 shows how the virtual addresses of processes A, B and C map to possibly different physical addresses within memory 12.

The information on this mapping is contained in virtual address tables, such as table 301, FIG. 3, located within main memory 12 (FIG. 1). There is one of these tables for each active process in the system. Each table contains the information requested to map valid virtual addresses to physical addresses, and also indicates what permissions (Read, Write and eXecute) the process has on that block of memory. There are two basic memory models, the page model (where translation and permission boundaries are the same) and the segment and page model (where the translation (page) boundaries are smaller than the permission (segment) boundaries).

Figure 4:
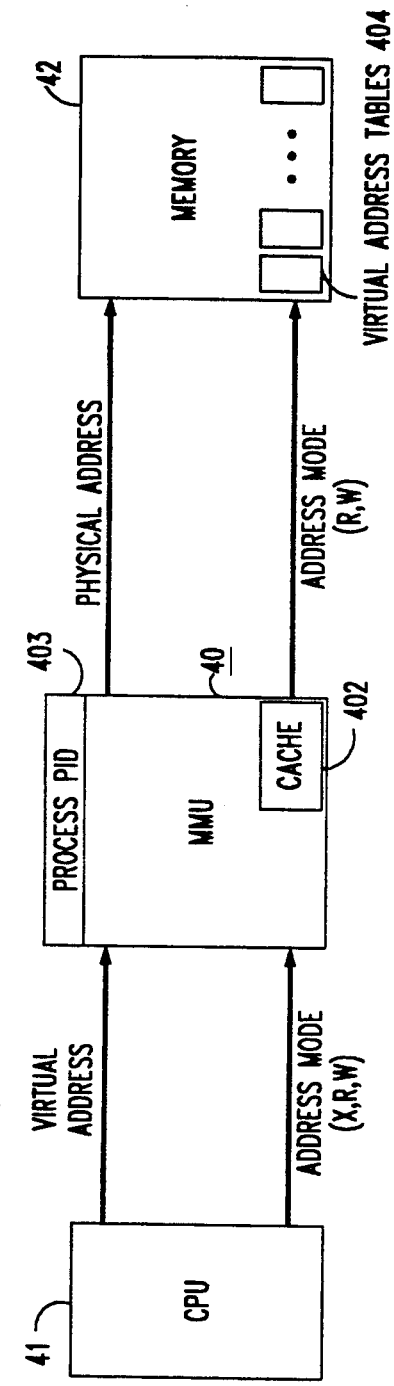
FIG. 4 shows a prior art hardware configuration.

One example of the hardware currently being utilized is shown in FIG. 4. Note that CPU 41 sends a virtual address and an address mode (R, W or X) to MMU 40. MMU 40 then consults the virtual address table located in memory 42 for the current process (whose ID was loaded into MMU 40 earlier by CPU 41) and determines the translation and permission access for this virtual address. If it is an invalid, access, a fault is returned to CPU 41. If it is a valid access, the correct physical address is used to read (or write) memory 42. Since many MMUs maintain a cache 402 of translation and permission entries, it is possible for the translation information to be in the cache and, thus, the MMU can perform its job without accessing memory 42. If the information is not in cache 402, MMU 40 must retrieve its address from memory 42, virtual address tables 404, check permissions, and then send the physical address for the proper access to memory 42.

Figure 5:
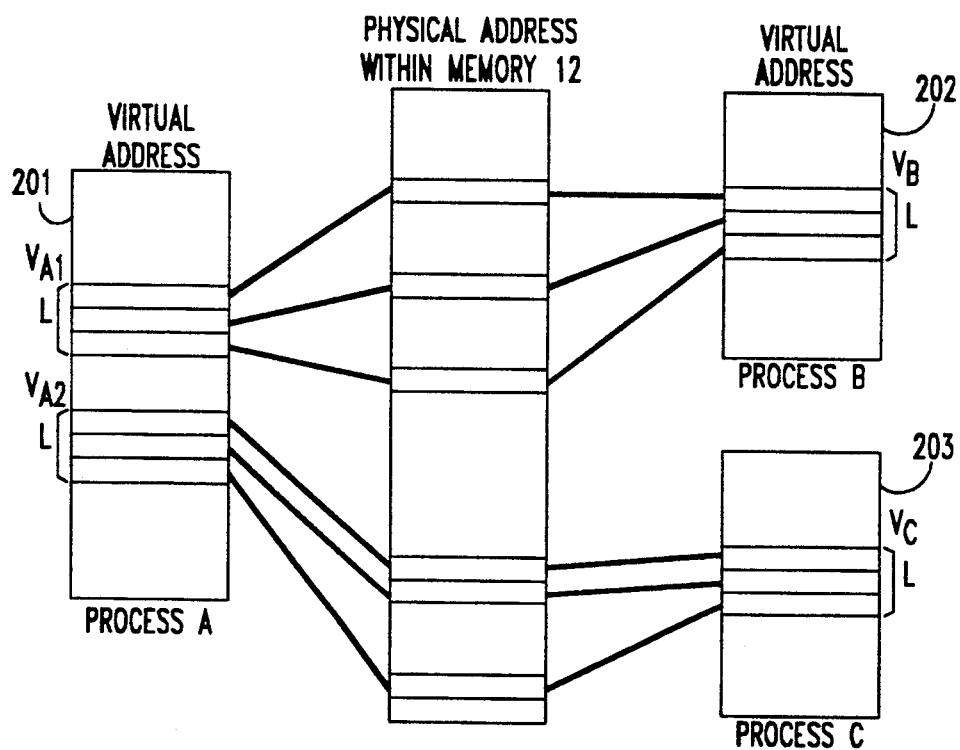
FIG. 5 shows mapping tables set up for a copy operation.

For the current example, process A must first verify that processes B and C have the proper permissions for the copy. To do this, process A must retrieve permission information for process B for each "permission block" between addresses VB and (VB+L), FIG. 5, and then must verify that each permission block has read permission. Process A must then retrieve permission information for each permission block for process C between addresses VC and (VC+L), FIG. 5, verify that each block has write permission. If the permissions are correct, process A must then set up a "scratch" area in its virtual address space pointing to the physical addresses involved in the copy. To do this, it must retrieve the translation information for process B for each "translation block" between addresses VB and (VB+L) and then set up its address tables so that its translation blocks between addresses VA1 and (VA1+L) point to the same physical addresses as process B's VB to (VB+L). Process A must then set up its address tables so that its translation blocks between addresses VA2 and (VA2+L) point to the same physical addresses as process C's VC to (VC+L). At this point, as shown in FIG. 5, process A's address table translates the virtual address VA1, to the same physical address as process B's VB. In addition, process A's address VA2 translates to the same physical address as process C's address VC. Process A then copies L bytes of data from VA1 to VA2.

As discussed above, process A must flush the MMU translation cache (if any) each time that it changes the virtual address tables to prevent erroneous address translations and permissions. Also note that, depending on the capabilities of the MMU, process A retrieves permission and translation information for processes B and C by either looking at the virtual address tables for processes B and C in memory, or executing a "probe" instruction (which causes the MMU to get translation and permission information from memory (or from its cache)).

As discussed above, the hardware configuration of our concurrent context MMU is shown in FIG. 1. One difference between it and the prior art MMU is that MMU 10 has registers 103, 104 and 105 for three process IDs, compared with only one (register 403, FIG. 4) for the prior art MMU. Most of the time, only one register (execute process 103) is used (or all three can point to the same table). When a concurrent context operation is to be performed, however, the other two ID registers (Read and Write IDs 104, 105, respectively) are loaded from CPU 11, and the mode of MMU 10 is set to concurrent context via mode control 106. In the concurrent context mode, the ID used will depend on the type of access. Thus, the execute ID is used for instruction fetches, the read ID for operand reads and the write ID is used for operand writes. At the conclusion of the concurrent context operation, the mode of the MMU is set back to normal.

For the example defined above, process A will first load read ID 104 register with process B's process ID and will then load write ID 105 register with process C's process ID. Process A will then set MMU 10's mode control 106 (FIG. 1) to concurrent context and will copy L bytes of data from VB to VC. Note that MMU 10 will automatically use the correct virtual address table based on the type of access (R, W or X), and will, therefore, automatically verify permissions and translate to the correct physical addresses. At the conclusion of the copy operation, process A will set MMU 10's mode control 106 back to normal.

Note that if MMU 10 detects an address violation, it will signal a fault to CPU 11 and process A will receive this fault and take appropriate action. To simplify processing of the fault, MMU 10 will return to normal mode when a fault is detected.

Using our invention, it is possible to upgrade MMU 40 (FIG. 4) in a prior art processing system to a concurrent context MMU 10 without changing the software for that system. The new MMU 10 would replace the ID register 403 in the current MMU 40 with the execute ID register 103 and initialize mode control 106 in the normal mode. Thus, all current software would continue to function as designed. New or upgraded software would take advantage of the concurrent context MMU as described above. This allows systems to be upgraded without requiring old software to be modified.

Note that the prior art includes MMU's that have multiple contexts, in the sense that the MMU cache can retain mapping information for more than one process at a time, across process context switches. However, such an MMU can use the information from only one of the process tables during the execution of a given instruction. By contrast, in the present invention the MMU can use the information from multiple process tables during the course of executing a single instruction.

What is claimed is:

1. A memory management unit for use in controlling data storage and retrieval from a memory, said memory management unit translating virtual addresses to physical addresses within said memory, said virtual addresses being received from a plurality of sources along with, for each received instruction, a read or a write instruction, each source having at least one virtual address mapped to at least one physical address, said memory management unit comprising
   means for storing a set of translation information for each of said plurality of sources, each set of translation information mapping at least one virtual address to a respective physical address,
   recording means including a read register and a write register for concurrently recording identities, each of a different one of said plurality of sources, and
   means, responsive to an instruction received from a particular one of said plurality of different sources, for selecting, for use by said memory management unit, the one of said sets of translation information that is stored for the source whose identity is recorded a) in said read register, if said received instruction is a read instruction, or b) in said write register, if said received instruction is a write instruction.

2. The memory management unit set forth in claim 1 wherein said memory management unit is interposed between a central processing unit (CPU) and said memory and wherein said storage or retrieval instructions are received from said CPU, and wherein said plurality of sources includes a plurality of processes operating within said CPU.

3. The memory management unit set forth in claim 1 wherein said recording means and selecting means each operate in response to the receipt of predetermined mode control information, and wherein said memory management unit further comprises means for establishing a default selection in response to the absence of said mode control information, said default selection controlling which one stored set of translation information will be utilized to perform said translation.

4. The memory management unit set forth in claim 1 wherein in a default mode said selecting means includes means for selecting a particular one of said stored sets of translation information as a function of the source of said received instruction but independent of whether it is a read instruction or a write instruction.

5. In a system having a memory management unit (MMU) interposed between a plurality of sources of virtual addresses provided by a central processing unit (CPU) and a memory having physical locations to which the virtual addresses are mapped, and wherein the same virtual address from different sources may be mapped to the same physical location within said memory, and wherein said MMU contains a first set of translation mapping information for controlling the storage or retrieval of information to or from said memory in response to virtual addresses presented to said MMU, said first set of translation information being associated with a first source of presented virtual addresses, the improvement comprising
   means for storing within said MMU at least one other set of translation information associated with a second source of virtual addresses,
   means for establishing a plurality of sets of translation information that are concurrently accessible within one CPU execution cycle, including said first set and the other set, for controlling each translation between a presented virtual address and its associated physical address, and
   means operative in response to mode control information from said first source associated with each said presented virtual address for utilizing either one accessible set of translation information or said concurrently accessible plurality of sets of translation information.

6. The improvement set forth in claim 5 further comprising means for choosing either said first set or the other set as a default set.

7. The improvement set forth in claim 6 wherein said presented virtual address is presented in a data packet having address bits, and read, write, and execute bits, and wherein in a concurrently accessible plurality of sets mode, at least one register in said MMU is operative in response to a respective one of said read, write and execute bits provided by the CPU.

8. The improvement set forth in claim 7 wherein said memory management unit includes a plurality of registers and wherein said choosing means further inhibits a subset of said registers when a default mode is established.

* * * * *